United States Patent Office 2,890,246
Patented June 9, 1959

2,890,246

S-(1,2-DICHLOROVINYL)-CYSTEINE AND METHOD FOR ITS PREPARATION

Leonard L. McKinney and Francis B. Weakley, Peoria, and Arthur C. Eldridge, Morton, Ill., assignors to the United States of America as represented by the Secretary of Agriculture No Drawing. Application September 27, 1957
Serial No. 686,794

4 Claims. (Cl. 260—534)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to a novel chemical compound S-(1,2-dichlorovinyl)-cysteine which may also be designated α-amino,β-thio-(1,2-dichlorovinyl)-propionic acid. This invention also relates to novel methods for its preparation. The compound has the following formula:

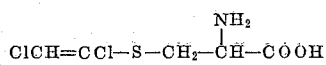

It is a white crystalline compound, sparingly soluble in water and substantially insoluble in organic solvents. The compound may be made by reactions which may be shown schematically as follows:

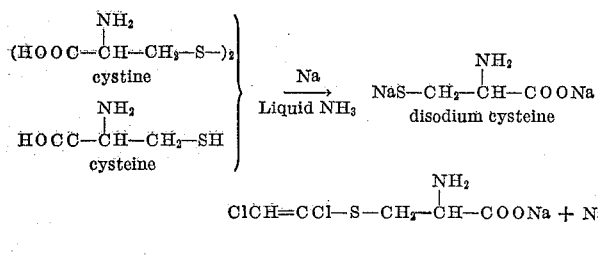
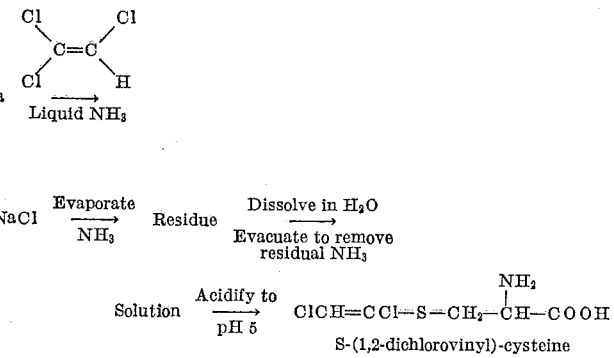

The disodium salt of cysteine is made by adding either cystine or cysteine to liquid ammonia in which an equivalent amount of sodium metal has been dissolved, i.e., four moles of sodium per mole of cystine and two moles per mole of cysteine. Since sodium forms a blue solution when dissolved in liquid ammonia, the correct amount of cysteine or cystine may be determined by adding until the blue color disappears. Hydrogen gas is liberated while the disodium cysteine is being formed. Approximately one mole of trichloroethylene per mole of disodium cysteine is then slowly added to the liquid ammonia solution. The trichloroethylene can be added more rapidly if it is pre-cooled on Dry Ice or diluted with liquid ammonia or other inert solvent. The reaction product, sodium S-(1,2-dichlorovinyl)-cysteinate, is fairly insoluble in liquid ammonia and tends to form a gelatinous precipitate.

After the liquid ammonia evaporates a brown residue is left which contains primarily the sodium salt of S-(1,2-dichlorovinyl)-cysteine which is soluble in ethanol and methanol, and sodium chloride which is insoluble in these alcohols. The product may be separated from sodium chloride at this stage by extracting with alcohol. However, we prefer to dissolve the residue in water, evacuate to remove the residual ammonia, and add acid to pH 5 to precipitate the relatively insoluble S-(1,2-dichlorovinyl)-cysteine. Both mineral acids and organic acids have been used, but acetic acid is preferred because its use avoids the possibility of forming a salt with the product and thus solubilizing it. Ethanol or methanol may be added to the aqueous pH 5 precipitate to increase the yield of product. The crude product may contain a little unreacted cysteine which is readily removed by crystallization from hot water followed by the addition of alcohol, and traces of cysteine which is solubilized and removed by adding a little potassium cyanide or sodium bisulfite and recrystallizing. The yield of product based on starting cysteine has ranged from 65 to 75 percent in various preparations.

The purity of the product is easily determined by paper chromatography using 70:30 n-propanol-water giving a ninhydrin positive spot at $R_f$ 0.70. The spot also gives a blue color with 4-(p-nitrobenzyl)-pyridine to distinguish it from the other amino acids. The spot can also be located under ultraviolet light because the compound exhibits a maximum absorption at 258 millimicrons with a molecular extension coefficient of 3200. The compound also has peak of maximum absorption at 210 millimicrons with a molecular extension coefficient of 8600. These absorption properties are characteristic of a vinyl group adjacent to a sulfur atom and are evidence for the structure of the compound. Evidence for the two chlorine atoms being on different carbons is obtained from the infrared spectrum of the compound. The compound also gives a positive test for sulfur by the iodoplatinic acid reagent.

(S-dichlorovinyl)-L-cysteine has powerful fungicidal activity but no herbicidal activity. It, therefore, can be used to control mold infections on plants. Aqueous solutions containing as little as 25 parts per million of the compound were found to be effective in inhibiting the growth of the phytopathogenic mold known as *Mucor ramannianus*. These same low concentrations of the compound have been shown to inhibit the growth of a yeast and other fungi indicating fairly general activity toward fungi. This compound also exhibits algaecidal activity and prevents the growth of algae in water when present to the extent of about 100 parts per million.

Another use for this new compound is that of an insecticide. An aqueous solution containing 0.5 percent of the new compound was effective in killing 80 to 90 percent of a fruit fly population on a single application. It was also found to be effective in killing fruit flies when added to fly bait at levels of 100 to 200 parts per million.

The following examples are illustrative of the methods of carrying out the invention.

EXAMPLE 1

Sodium metal and dry L-cysteine were added in portions to 250 ml. of dry liquid ammonia while stirring. The sodium was added first to give the characteristic blue color and then a portion of cysteine was added until the blue color disappeared indicating that the disodium salt of cysteine had been formed. A total of 12.1 g. (0.10 mole) of cysteine was added. Trichloroethylene (8.96 ml., 0.10 mole) was cooled on Dry Ice and added slowly while stirring the reaction mixture. The liquid ammonia was then allowed to evaporate leaving a slightly colored residue which was dissolved in 100 ml. of water and a vacuum applied to remove the last traces of ammonia. Water was then added to adjust the volume to 300 ml. at which time the pH was 11.9. The pH was then adjusted to 5.0 by adding acetic acid. One volume of 95 percent ethanol was added and the mixture, containing a precipitate, was allowed to stand in a refrigerator overnight to complete crystallization, and then filtered.

The crude precipitate was dissolved in 725 ml. of water at 70° C. and 1 gram of activated carbon added to decolorize. An equal volume of ethanol was added to the clear filtrate and the compound allowed to crystallize. The crystals weighed 11.16 g. An additional 2.77 g. was obtained by evaporating the mother liquor and filtrate from the first crystallization for a total yield of 67 percent of theory. The final mother liquor contained 5.9 g. (0.101 mole) of sodium chloride or 101 percent of theory.

Paper chromatography with 70:30 n-propanol-water showed traces of cysteine and cystine as impurities. Two methods were used to remove the last traces of impurities: (a) 1.16 g. was dissolved in 30 ml. of water containing 0.3 ml. of 28 percent ammonia and 30 mg. of potassium cyanide giving a solution of pH 9.2. Ethanol (30 ml.) was added and the pH adjusted to 5.0 with acetic acid from which 1.08 g. (93 percent recovery) of crystals in the form of needle-like clusters was obtained. These crystals melted at 155-6° C. with decomposition. (b) 12.6 g. was dissolved in the minimum amount of water at 80° C. or 500 ml., showing a solubility of 2.5 percent. Potassium cyanide (0.5 g.) was added and the mixture set in a refrigerator overnight to crystallize. A total of 11.0 g. of pure needle-like crystals was recovered (87 percent) by evaporating the filtrate. The crystals melted at 155-6° C. with decomposition and were chromatographically pure. The analysis agreed with that for S-(1,2-dichlorovinyl-L-cysteine:

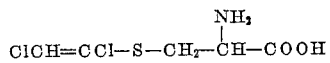

$$ClCH=CCl-S-CH_2-\overset{\overset{NH_2}{|}}{CH}-COOH$$

*Analyses*

|        | C     | H    | N    | S     | Cl    |
|--------|-------|------|------|-------|-------|
| Calcd  | 27.79 | 3.27 | 6.48 | 14.84 | 32.82 |
| Found  | 27.89 | 3.29 | 6.46 | 14.94 | 32.8  |

Neutral equivalent (formal titration): Calculated 216. Found 215.

Solubility, g. per 100 ml.: $H_2O$, $2.5^{75°}$; $1.0^{25°}$; $0.75^{°}$. 50 percent EtOH, $0.35^{°}$.

Ultraviolet absorption: $\lambda_{max.}$ 2580, $\epsilon=3200$; $\lambda_{max.}$ 2100, $\epsilon=8560$.

$pI'=5.2$ (no titration from pH 4.0 to 6.5).

EXAMPLE 2

Sodium metal was added to 50 ml. of liquid ammonia to give the characteristic blue solution. L-cystine was then slowly added to the liquid ammonia solution, while stirring, until the blue color disappeared. A total of 2.0 g. (0.0083 mole) of cystine was required. Trichloroethylene (2.0 ml., 0.023 mole) was added to the liquid ammonia mixture while stirring. The ammonia was allowed to evaporate and the last traces removed under vacuum leaving a brown residue. This residue was extracted with four 50 ml. volumes of 95 percent ethanol to give a colored extract and a residue containing sodium chloride. The alcoholic extract was evaporated to dryness under vacuum and the residue dissolved in 50 ml. of water. This aqueous solution had a pH of 11.85 and was adjusted to pH 5.5 with sulfuric acid to give a precipitate of the crude S-(1,2-dichlorovinyl)-L-cysteine weighing 3.2 grams.

The crude product was dissolved in 120 ml. of hot water (80° C.), treated with activated carbon to decolorize, and then crystallized by adding ethanol. The crystallized product melted at 156° C. with decomposition. A paper chromatograph with 70:30 n-propanol-water showed only one spot at $R_f$ 0.70. The spot was ninhydrin and 4-(p-nitrobenzyl)-pyridine positive, and nitro-prusside negative.

*Analyses*

|        | C     | H    | N    | S     | Cl    |
|--------|-------|------|------|-------|-------|
| Calcd  | 27.79 | 3.27 | 6.48 | 14.84 | 32.82 |
| Found  | 27.83 | 3.41 | 6.34 | 15.0  | 32.4  |

EXAMPLE 3

The fungicidal activity of S-dichlorovinyl)-L-cysteine was tested with a phytopathogenic mold (*Mucor ramannianus*) and a yeast (*Sacchromyces pastorianus*). The tests were carried out by adding a solution of the compound to paper discs of 12.5 millimeter diameter and placing the discs on an inoculated agar medium contained in a Petri dish. The dishes were then incubated for 24 hours at 30° C. and examined for inhibition of fungus growth. In this test the clear agar medium becomes cloudy or opaque because of fungus or mold growth. The area around the 12.5 millimeter paper discs remains clear when there is inhibition preventing the growth of fungus, because of diffusion of the fungicide into the agar medium. Fungicidal activity is determined by measuring the diameter of the inhibition zone, and the measurement includes the diameter of the paper disc because inhibition occurs under the disc as well as around it.

The average fungicidal activity of S-dichlorovinyl)-L-cysteine as determined by the disc assay method is shown in Table I:

TABLE I

| Micrograms added to 12.5 mm. paper disc | Diameter of inhibition zone in millimeters | |
|---|---|---|
| | Mold | Yeast |
| 1 | 0 | 0 |
| 2.5 | 15 | 18 |
| 5 | 18 | 19 |
| 10 | 22 | 21 |
| 20 | 24 | 22 |
| 30 | 26 | 24 |

The highest concentration failed to inhibit the growth of *Baccillus subtilis* and *Corynebacterium flaccumfaciens*. However, another mold, *Aspergillus niger* was inhibited in the same manner as was the *Mucor* fungus.

EXAMPLE 4

The insecticidal activity of S-(dichlorovinyl)-L-cysteine was tested by spraying fruit flies (Drosophila, wild, redeye type) with a 0.5 percent solution of the compound. For this test adult flies were transferred to a 125 ml. wide mouth bottle containing cheese cloth on the bottom to provide a platform for the flies and to absorb moisture to prevent drowning. The mouth of the bottle was covered with cheese cloth through which the spray was introduced. Because of the possibility of drowning and death from natural causes, a control was run in which water was used as a spray. The results are shown in Table II.

TABLE II

| Spray | No. flies used | No. alive at 24 hrs. | Percent killed |
|---|---|---|---|
| 3.0 ml. water | 83 | 52 | 37 |
| 3.0 ml. 0.5% soln | 71 | 15 | 79 |
| Do | 37 | 2 | 94 |
| Do | 80 | 11 | 87 |

In addition to the above experiment, S-(dichlorovinyl)-L-cysteine was incorporated into the nutrient medium on which the flies fed. Nutrient mediums containing 130 and 260 p.p.m. of the compound causes the death of 100 percent and 96 percent of the flies in 7 days while only 13 percent of the flies died on the untreated nutrient medium.

EXAMPLE 5

S-(dichlorovinyl)-L-cysteine was tested on an algaecide. A control flask containing 100 ml. of water and a second flask containing 100 ml. of 100 p.p.m. of an aqueous solution of the compound were set at room temperature (25°–30° C.). To each flask were added traces of urea, ammonium sulfate, glucose, fish food and soybean flour as nutrients. Both flasks were then inoculated with 5 ml. of water which was green with algae growth.

The two flasks were observed over a period of one month. The control flask became green with algae growth within one week and remained green during the whole month. The second flask containing 100 p.p.m. of S - (dichlorovinyl) - L-cysteine remained colorless throughout the whole month demonstrating toxicity to algae.

EXAMPLE 6

The herbicidal activity of S-(dichlorovinyl)-L-cysteine was tested by applying solutions to the stems and leaves of bean seedlings and plants, grass and dandelions. Solutions containing from 100 p.p.m. to 0.5 percent of the compound were repeatedly applied to these plants without killing them. In some instances where the solid compound dried on leaves, chlorotic spots were produced but the plants quickly healed. In several instances solutions were applied to the first leaves of bean sprouts as they emerged without killing the plant.

In one test bean seedlings contained in a pot filled with dirt were watered for a period of 2 weeks with a solution containing 20 p.p.m. of the compound without producing toxic effects.

It was concluded from these experiments that S-(dichlorovinyl)-L-cysteine had very little, if any, herbicidal acitvity.

We claim:

1. S-(1,2-dichlorovinyl)-cysteine of the following formula:

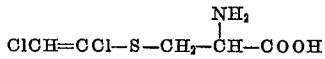

2. A process for producing S-(1,2-dichlorovinyl)-cysteine which comprises reacting sodium dissolved in liquid ammonia with a compound selected from the group consisting of cysteine and cystine to produce disodium cysteine, adding to the reaction mixture about one molecular equivalent of trichloroethylene per mole of disodium cysteine to produce the sodium salt of S-(1,2-dichlorovinyl)-cysteine, removing the ammonia, and then acidifying to about pH 5 to produce S-(1,2-dichlorovinyl)-cysteine.

3. The process of claim 2 wherein cysteine is reacted with sodium dissolved in liquid ammonia.

4. The process of claim 2 wherein cystine is reacted with sodium dissolved in liquid ammonia.

References Cited in the file of this patent

UNITED STATES PATENTS 2,757,196   Doerner _____ July 31, 1956

OTHER REFERENCES

Stoll et al.: Helv. Chim. Acta. vol. 31 (1948), pp. 189–210 (p. 198 relied upon).

Armstrong et al.: J. Org. Chem., vol. 16 (1951), pp. 749–53.

UNITED STATES PATENT OFFICE
CERTIFICATE OF CORRECTION

Patent No. 2,890,246                                            June 9, 1959

Leonard L. McKinney et al.

It is hereby certified that error appears in the printed specification of the above numbered patent requiring correction and that the said Letters Patent should read as corrected below.

Column 2, line 10, for "cysteine" read -- cystine --; column 3, line 43, for "S-(1,2-dichlorovinyl-L-cysteine" read -- S-(1,2-dichlorovinyl)-L-cysteine --; column 4, line 11, for "crystallized" read -- recrystallized -- line 25, for "S-dichlorovinyl)-L-cysteine" read -- S-(dichlorovinyl)-L-cysteine --; line 27, for "Sacchromyces", in italics, read -- Saccharomyces -- in italics; lines 43 and 44, for "S-dichlorovinyl)-L-cysteine" read -- S-(dichlorovinyl)-L-cysteine --.

Signed and sealed this 3rd day of November 1959.

(SEAL)
Attest:

KARL H. AXLINE

Attesting Officer

ROBERT C. WATSON

Commissioner of Patents